(12) United States Patent
Takiguchi

(10) Patent No.: US 10,576,580 B2
(45) Date of Patent: Mar. 3, 2020

(54) LIGHT IRRADIATING DEVICE AND LIGHT IRRADIATING METHOD

(71) Applicant: HAMAMATSU PHOTONICS K.K., Hamamatsu-shi, Shizuoka (JP)

(72) Inventor: Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 233 days.

(21) Appl. No.: 15/509,265

(22) PCT Filed: Aug. 26, 2015

(86) PCT No.: PCT/JP2015/074061
§ 371 (c)(1),
(2) Date: Mar. 7, 2017

(87) PCT Pub. No.: WO2016/039148
PCT Pub. Date: Mar. 17, 2016

(65) Prior Publication Data
US 2017/0259374 A1    Sep. 14, 2017

(30) Foreign Application Priority Data
Sep. 10, 2014    (JP) .................................. 2014-184020

(51) Int. Cl.
*B23K 26/064*    (2014.01)
*B23K 26/073*    (2006.01)
(Continued)

(52) U.S. Cl.
CPC .......... *B23K 26/064* (2015.10); *B23K 26/073* (2013.01); *G02F 1/01* (2013.01);
(Continued)

(58) Field of Classification Search
CPC ....... B23K 26/073; B23K 26/064; G02F 1/13; G02F 1/0105; G02F 1/01; G02F 2203/12
(Continued)

(56) References Cited

U.S. PATENT DOCUMENTS 5,760,408 A * 6/1998 Kikuchi .............. G03F 7/70091
250/492.1
7,151,609 B2 * 12/2006 Chalmers ........... G01B 11/0625
356/630
(Continued)

FOREIGN PATENT DOCUMENTS

| CN | 101349871 | 1/2009 |
| CN | 101772398 A | 7/2010 |

(Continued)

OTHER PUBLICATIONS

English-language translation of International Preliminary Report on Patentability (IPRP) dated Mar. 23, 2017 that issued in WO Patent Application No. PCT/JP2015/074061.

(Continued)

*Primary Examiner* — Eric S Stapleton
(74) *Attorney, Agent, or Firm* — Drinker Biddle & Reath LLP

(57) ABSTRACT

A light irradiation apparatus includes a light source, a dispersive element, a spatial light modulator, and a focusing element. The dispersive element disperses pulsed light output from the light source and outputs the light. The dispersive element includes, for example. The spatial light modulator modulates a phase spectrum or an intensity spectrum of the light output from the dispersive element and outputs the light. The focusing element receives the light output from the spatial light modulator in a dispersing state, and focuses the light on a common region (focusing region) in a surface or an inside of an object.

8 Claims, 6 Drawing Sheets

(51) Int. Cl.
*G02F 1/01* (2006.01)
*G02F 1/13* (2006.01)

(52) U.S. Cl.
CPC .............. *G02F 1/0105* (2013.01); *G02F 1/13* (2013.01); *G02F 2203/12* (2013.01)

(58) Field of Classification Search
USPC .................................................. 219/121.73
See application file for complete search history.

(56) References Cited

U.S. PATENT DOCUMENTS

| | | | | |
|---|---|---|---|---|
| 7,430,071 | B2* | 9/2008 | Resan | G02F 1/1313 359/237 |
| 7,542,192 | B2* | 6/2009 | Resan | G02F 1/1313 359/237 |
| 7,576,907 | B1* | 8/2009 | Bartels | H01S 3/0057 359/279 |
| 7,787,779 | B2* | 8/2010 | Weiner | G02F 2/002 398/201 |
| 8,239,165 | B1* | 8/2012 | Young | H02S 50/10 702/182 |
| 8,675,699 | B2* | 3/2014 | Dantus | G01J 11/00 372/25 |
| 9,018,562 | B2* | 4/2015 | Dantus | B23K 26/032 219/121.76 |
| 2002/0135763 | A1 | 9/2002 | MacKinnon et al. | |
| 2003/0095255 | A1* | 5/2003 | Fujimoto | G02B 21/002 356/326 |
| 2003/0099264 | A1 | 5/2003 | Dantus et al. | |
| 2004/0233944 | A1* | 11/2004 | Dantus | G01N 21/4795 372/25 |
| 2005/0174583 | A1* | 8/2005 | Chalmers | G01B 11/0625 356/630 |
| 2005/0174584 | A1* | 8/2005 | Chalmers | G01B 11/0625 356/630 |
| 2006/0164657 | A1* | 7/2006 | Chalmers | G01B 11/0625 356/630 |
| 2006/0176542 | A1* | 8/2006 | Muro | G01N 21/6458 359/290 |
| 2007/0085788 | A1* | 4/2007 | Harada | G02F 1/135 345/84 |
| 2007/0121071 | A1* | 5/2007 | Jackson | A61B 3/0033 351/246 |
| 2007/0268546 | A1* | 11/2007 | Resan | G02F 1/1313 359/237 |
| 2008/0310004 | A1* | 12/2008 | Resan | G02F 1/1313 359/238 |
| 2009/0059968 | A1* | 3/2009 | Luo | H01S 3/0606 372/18 |
| 2010/0085994 | A1* | 4/2010 | Resan | H01S 3/1112 372/25 |
| 2011/0122407 | A1* | 5/2011 | Jalali | G01N 21/65 356/301 |
| 2011/0211600 | A1* | 9/2011 | Dantus | H01S 3/0057 372/25 |
| 2012/0236305 | A1* | 9/2012 | Zanni | G01J 3/433 356/326 |
| 2013/0076861 | A1* | 3/2013 | Sternklar | G01J 1/42 348/46 |
| 2013/0139437 | A1* | 6/2013 | Maxik | H05B 37/02 47/58.1 LS |
| 2017/0259374 | A1* | 9/2017 | Takiguchi | B23K 26/073 |

FOREIGN PATENT DOCUMENTS

| | | |
|---|---|---|
| CN | 102265207 A | 11/2011 |
| CN | 103917914 A | 7/2014 |
| JP | 2002-273583 | 9/2002 |
| JP | 2005-262290 | 9/2005 |
| JP | 2007-526521 | 9/2007 |
| JP | 2010-075997 A | 4/2010 |
| JP | 2013-27930 A | 2/2013 |
| JP | 2013-092688 A | 5/2013 |
| WO | WO-02/063206 A2 | 8/2002 |
| WO | WO 2013/061960 | 5/2013 |

OTHER PUBLICATIONS

Guanghao Zhu et al., "Simultaneous spatial and temporal focusing of femtosecond pulses," Optics Express, Mar. 21, 2005, pp. 2153-2159, vol. 13, No. 6.

Dawn N. Vitek et al., "Temporally focused femtosecond laser pulses for low numerical aperture micromachining through optically transparent materials," Optics Express, Aug. 16, 2010, pp. 18086-18094, vol. 18, No. 17.

Keisuke Sorimoto et al., "Fast Aberration-Correction Algorithm for LCOS-based Optical Switch," The Institute of Electronics, Information and Communication Engineers, Gijutsu Hokoku, OPE2012-84, Aug. 2012, pp. 121-125, including partial English translation.

* cited by examiner

LIGHT IRRADIATING DEVICE AND LIGHT IRRADIATING METHOD

TECHNICAL FIELD

An aspect of the present invention relates to a light irradiation apparatus and a light irradiation method.

BACKGROUND ART

Light output from a light source is focused on a surface or an inside of an object, so that processing or the like can be performed in a focusing region of the object. As one of focusing technologies, technology called simultaneous spatial and temporal focusing (hereinafter, referred to as "SSTF") is known (refer to Non Patent Documents 1 and 2).

SSTF is as follows. Pulsed light (for example, ultra-short pulsed laser light) having a certain wavelength band is dispersed by a dispersive element, and light is output to an optical path different according to a wavelength. Further, light of each wavelength output from the dispersive element is focused by a focusing element on a common region via the optical path different according to the wavelength. As an example of the dispersive element, a diffraction grating pair or a prism pair is used. A direction or a position of each diffraction grating or each prism is adjusted, so that timing of light of each wavelength arriving at the focusing region can be set.

In SSTF, the light of each wavelength dispersed by the dispersive element and arriving at the focusing region by the focusing element passes through the optical path different according to the wavelength, and further, arrives at the focusing region at timing different according to the wavelength. Therefore, a light energy density increases in the focusing region, and on the other hand, the light energy density decreases in an optical path until reaching the focusing region, so that an influence on the object is reduced. Further, a temporal waveform of pulsed light in the focusing region can be adjusted.

CITATION LIST

Non Patent Literature

Non Patent Document 1: G. Zhu, et al., "Simultaneous spatial and temporal focusing of femtosecond pulses," Opt. Express., Vol. 13, No. 6, pp. 2153-2159 (2005)

Non Patent Document 2: D. N. Vitek, et al., "Temporally focused femtosecond laser pulses for low numerical aperture micromachining through optically transparent materials," Opt. Express., Vol. 18, No. 17, pp. 18086-18094 (2010)

SUMMARY OF INVENTION

Technical Problem

In conventional SSTF, the temporal waveform of the pulsed light in the focusing region can be adjusted by adjustment of the dispersive element, however, a degree of freedom for the adjustment is low. In addition, the temporal waveform of the pulsed light in the focusing region may not be adjusted as intended due to an influence of aberration, wavelength dispersion, and the like, of the optical path. One aspect of the present invention has been made to solve the above problem, and an object thereof is to provide a light irradiation apparatus and a light irradiation method in which a degree of freedom for adjustment of a temporal waveform of pulsed light in a focusing region is high and a desired temporal waveform can be easily realized.

Solution to Problem

The light irradiation apparatus according to one aspect of the present invention is a light irradiation apparatus for forming light of a desired temporal waveform in a focusing region, and the apparatus includes (1) a light source for outputting pulsed light, (2) a dispersive element for dispersing the pulsed light output from the light source, (3) a spatial light modulator for modulating a phase spectrum or an intensity spectrum of the light output from the dispersive element, and (4) a focusing element for receiving the light output from the spatial light modulator in a dispersing state, and focusing the light on the focusing region.

The light irradiation method according to one aspect of the present invention is a light irradiation method for forming light of a desired temporal waveform in a focusing region, and the method includes (1) dispersing pulsed light, by a dispersive element, (2) modulating a phase spectrum or an intensity spectrum of the light output from the dispersive element, by a spatial light modulator, and (3) receiving the light modulated by the spatial light modulator in a dispersing state, and focusing the light on the focusing region, by a focusing element.

In the above configuration, the pulsed light output from the light source is dispersed by the dispersive element, and is output to an optical path different according to a wavelength. Light of a wavelength according to a pixel position is input to each pixel on a modulation plane of the spatial light modulator. The phase spectrum or the intensity spectrum of the light output from the dispersive element is modulated by the spatial light modulator, and light after modulation is output to the optical paths different according to the wavelengths. Further, the light of each wavelength output from the spatial light modulator is focused on a common region via the optical path different according to the wavelength, by the focusing element. Then, the light of each wavelength focused on the common region is diverged via the optical path different according to the wavelength.

Advantageous Effects of Invention

According to one aspect of the present invention, a degree of freedom for adjustment of a temporal waveform of pulsed light in a focusing region is high, and a desired temporal waveform can be easily realized.

DESCRIPTION OF EMBODIMENTS

Hereinafter, embodiments of the present invention will be described in detail with reference to the accompanying drawings. In the description of the drawings, the same elements will be denoted by the same reference signs, without redundant description.

(First Embodiment)

Figure 1:
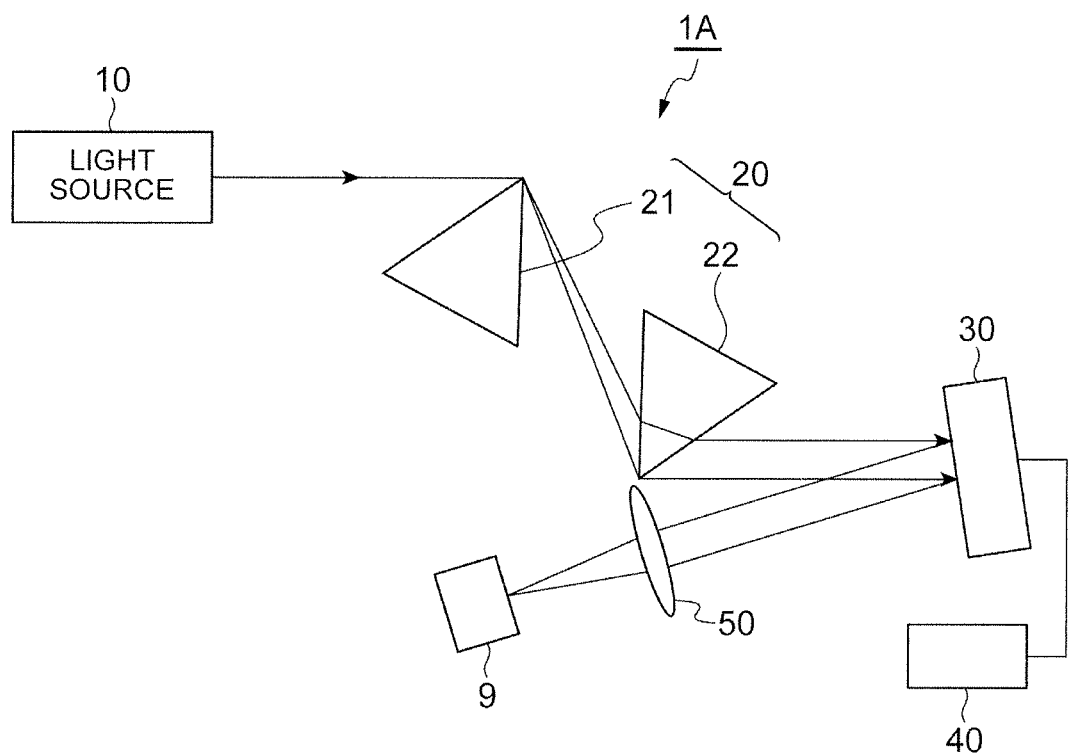
FIG. 1 is a diagram illustrating a configuration of a light irradiation apparatus 1A according to a first embodiment.

FIG. 1 is a diagram illustrating a configuration of a light irradiation apparatus 1A according to a first embodiment. The light irradiation apparatus 1A according to the first embodiment includes a light source 10, a dispersive element 20, a spatial light modulator 30, a control unit 40, and a focusing element 50, and performs focused irradiation of light for an object 9.

The light source 10 outputs pulsed light. The pulsed light has a certain wavelength band. The light source 14 preferably outputs collimated pulsed light, and preferably outputs horizontally polarized pulsed light. The light source 10 is preferably a mode-locked ultra-short pulse laser light source, and for example, a titanium-sapphire laser light source, or a fiber laser light source, or the like. A center wavelength of the pulsed light is preferably determined according to an object of irradiation of light for the object 9, and further, a condition in which amplitude or phase can be sufficiently modulated in the spatial light modulator 30. When the spatial light modulator 30 is of a phase modulation type, in the wavelength of the light output from the light source 10, a phase modulation width in the spatial light modulator 30 is preferably secured by $\pi$[rad] or more.

The dispersive element (dispersive optical element) 20 disperses the pulsed light output from the light source 10, and outputs light to an optical path different according to a wavelength. The dispersion of the light is to spatially separate light for each wavelength. The dispersive element 20 includes, for example, prisms 21 and 22. If apex angles of the prisms 21 and 22 are equal to each other, the pulsed light output from the light source 10 is dispersed by the prism 21 of a front stage, and the dispersed light of each wavelength is output in a common direction by the prism 22 of a subsequent stage. Incident angles of the light for the prisms 21 and 22 or an interval of the prisms 21 and 22 is adjusted, so that an optical path of each wavelength can be adjusted.

The spatial light modulator 30 modulates a phase spectrum or an intensity spectrum of the light output from the dispersive element 20, and outputs light after modulation to an optical path different according to a wavelength. The spatial light modulator 30 may modulate both the phase spectrum and the intensity spectrum of the light. The spatial light modulator 30 is of a reflection type, and has a modulation plane in which a plurality of pixels for modulating amplitude or phase of input light and outputting light after modulation are arrayed. The spatial light modulator 30 modulates both or any one of the phase spectrum and the intensity spectrum of the light dispersed by the dispersive element 20, so that the modulator can cause the light focused by the focusing element 50 to be pulsed light of a desired temporal waveform in a focusing region.

The spatial light modulator 30 can perform both or any one of the amplitude modulation and the phase modulation on the input light in each pixel, on the basis of a drive signal provided from the control unit 40, and can output light after modulation. The spatial light modulator 30 may be, for example, a spatial light modulator using an electric address type liquid crystal element, a spatial light modulator using an optical address type liquid crystal element, or a variable mirror type spatial light modulator, or the like. The spatial light modulator 30 may perform only the amplitude modulation, perform only the phase modulation, or may perform both the amplitude modulation and the phase modulation.

The focusing element 50 focuses the light of each wavelength output from the spatial light modulator 30 on a common region (focusing region) in a surface or an inside of the object 9 via the optical path different according to the wavelength. The focusing element 50 is, for example, an objective lens, and can be configured to include one or more lenses.

Next, the control unit 40 will be described in detail. The control unit 40 has a control processor (control circuit), and executes a function of controlling the modulation of the light by the spatial light modulator 30. The control unit 40 provides a drive signal for driving a modulation operation in the spatial light modulator 30 to the spatial light modulator 3.0. The control unit 40 may be a device dedicated for the spatial light modulator 30, or may be configured using a versatile device such as a computer. In addition, the control unit 40 may be configured to be divided into the dedicated device and the versatile device. The control unit 40 provides a drive signal for driving the amplitude modulation or the phase modulation in each of the plurality of pixels of the modulation plane of the spatial light modulator 30 to the spatial light modulator 30.

The drive signal provided from the control unit 40 to the spatial light modulator 30 instructs a modulation amount of the amplitude or the phase in each of the plurality of pixels of the modulation plane, on the basis of a computer-generated hologram (CGH: Computer-generated Holigram (for example, kinoform)). The control unit 40 has an external input unit such as a keyboard to input a signal from the outside, a calculation unit to perform calculation of the computer-generated hologram and the like, a storage unit to store the computer-generated hologram and the like, a selection unit to select the computer-generated hologram stored in the storage unit on the basis of an input of a signal generated in the external input unit or inside, and a drive unit to generate a drive signal on the basis of the computer-generated hologram selected by the selection unit and provide the drive signal to the spatial light modulator 30. As a result, the spatial light modulator 30 can be controlled on the basis of the computer-generated hologram.

The computer-generated hologram displayed on the spatial light modulator 30 is preferably obtained by adding, for each pixel, a computer-generated hologram for phase modulation to modulate the phase spectrum of the input light, and a computer-generated hologram for intensity modulation to modulate the intensity spectrum of the input light. Further, a computer-generated hologram for correction to correct phase distortion of a wave front of light generated in an optical system until reaching the object 9 from the light source 10 or the like may be added for each pixel, if necessary. Further, a computer-generated hologram representing a wavelength-corrected blazed grating pattern having an intensity modulation distribution according to a diffraction efficiency distribution may be used as a computer-generated hologram for intensity correction.

When a temporal waveform of the focused pulsed light is adjusted to have a desired shape, it is necessary to adjust both or any one of the phase spectrum and the intensity spectrum of the pulsed light. Therefore, the control unit 40 calculates the computer-generated hologram for phase modulation and the computer-generated hologram for intensity modulation, on the basis of information of the temporal waveform of the pulsed light output from the light source 10 and information of a temporal waveform of pulsed light to be formed in the focusing region, and displays a computer-generated hologram based on the calculated computer-generated hologram for phase modulation and the calculated computer-generated hologram for intensity modulation on the spatial light modulator 30.

When the drive signal is generated in the control unit 40, preferably, a look-up table according to a wavelength, in which a relationship of a drive signal value and a modulation amount (pixel value) in each pixel is stored, is prepared in advance, and the drive signal value according to the modulation amount is obtained by referring to the look-up table.

Preferably, the control unit 40 holds in advance a temperature information table in which a relationship of the computer-generated hologram for correction and a temperature is stored, and obtains the computer-generated hologram for correction according to the temperature by referring to the temperature information table. When the computer-generated hologram for correction is stored, preferably, data compression is performed on the computer-generated hologram for correction and the hologram is stored. In this case, after the computer-generated hologram for correction on which the data compression has been performed is obtained, a process for performing data decompression on the hologram is necessary The control unit 40 needs to have a storage unit of a sufficient capacity according to a data amount, when the computer-generated hologram is stored. For example, in the case in which it is assumed that the computer-generated hologram is 8-bit data of an SVGA resolution (800 pixels× 600 pixels), when the data compression is not performed, a data amount of one computer-generated hologram becomes 480 kilobytes (=800×600×8 bits).

Next, an operation of the light irradiation apparatus 1A will be described, and in addition, a light irradiation method will be described. The pulsed light output from the light source 10 is dispersed by the dispersive element 20, and is output to the optical paths different according to the wavelengths. Light of a wavelength according to a pixel position is input to each pixel on the modulation plane of the spatial light modulator 30.

A phase spectrum or an intensity spectrum of light output from the dispersive element 20 is modulated by the spatial light modulator 30, and light after modulation is output to the optical paths different according to the wavelengths. Further, the light of each wavelength output from the spatial light modulator 30 is focused by the focusing element 50 on the common region (focusing region) in the surface or the inside of the object 9 via the optical path different according to the wavelength. Then, the light of each wavelength focused on the common region is diverged via the optical path different according to the wavelength.

Figure 2:
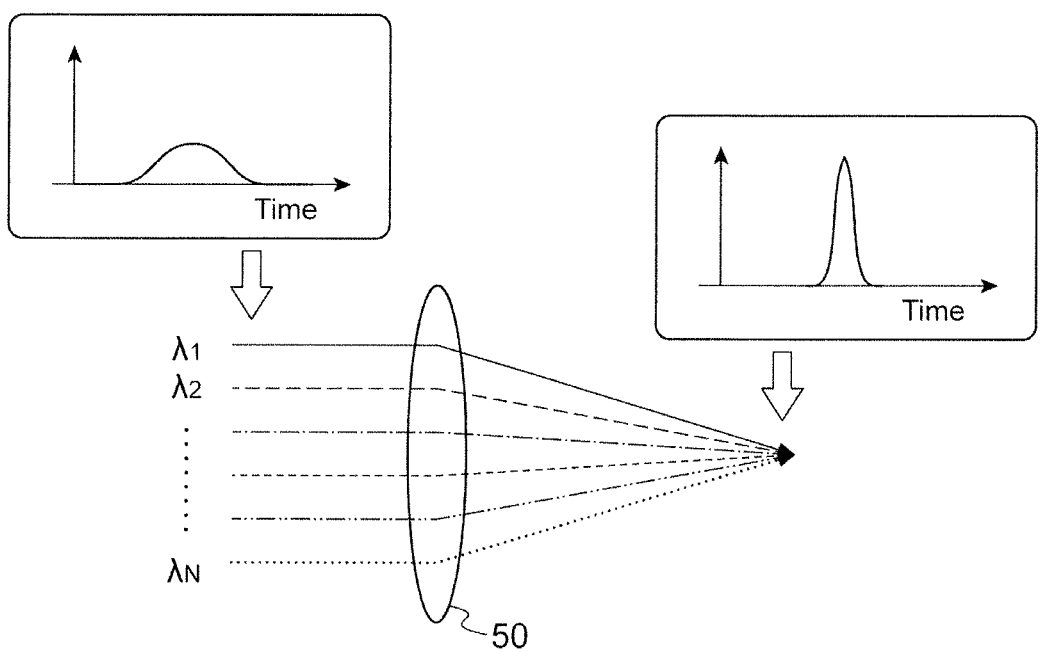
FIG. 2 is a diagram illustrating a function of a focusing element 50.

As such, in the light irradiation apparatus 1A, the light of each wavelength dispersed by the dispersive element 20 and arriving at the focusing region by the focusing element 50 passes through the optical path different according to the wavelength as illustrated in FIG. 2, and further, arrives at the focusing region at timing different according to the wavelength. Therefore, a light energy density increases in the focusing region, and on the other hand, the light energy density decreases in an optical path until reaching the focusing region, so that an influence on an object is reduced. Further, the temporal waveform of the pulsed light in the focusing region can be adjusted.

Further, in the light irradiation apparatus 1A according to the embodiment, the phase spectrum or the intensity spectrum of the light output from the dispersive element 20 is modulated by the spatial light modulator 30, and therefore, a degree of freedom for adjustment of the temporal waveform of the pulsed light in the focusing region is high, and a desired temporal waveform can be easily realized. For example, when there is the temporal waveform (that is, the desired temporal waveform) of the pulsed light to be formed in the focusing region, the spatial light modulator 30 can modulate the phase spectrum or the intensity spectrum of the light, according to a modulation pattern calculated on the basis of the temporal waveform of the pulsed light output from the light source 10 and the desired temporal waveforms. The modulation pattern may be the computer-generated hologram calculated or selected by the control unit 40.

Further, the light irradiation apparatus 1A according to the embodiment preferably compensates for wavelength dependency of a focusing characteristic of the focusing element 50 by modulating the phase spectrum or the intensity spectrum of the light by the spatial light modulator 30, and in addition, the apparatus preferably compensates for wavelength dependency of aberration, wavelength dispersion, absorption, or reflection, as the wavelength dependency of the focusing characteristic of the focusing element 50. By performing the compensation, the desired temporal waveform can be realized more surely.

FIG. 2 is a diagram illustrating a function of the focusing element 50. In FIG. 2, optical paths of light components having wavelengths $\lambda_1$ to $\lambda_N$, input to a lens functioning as the focusing element 50 and focused, are illustrated. As illustrated in FIG. 2, in SSTF, the light components of respective wavelengths arriving at the focusing region by the focusing element 50 pass through the optical paths different according to the wavelengths.

Figure 3:
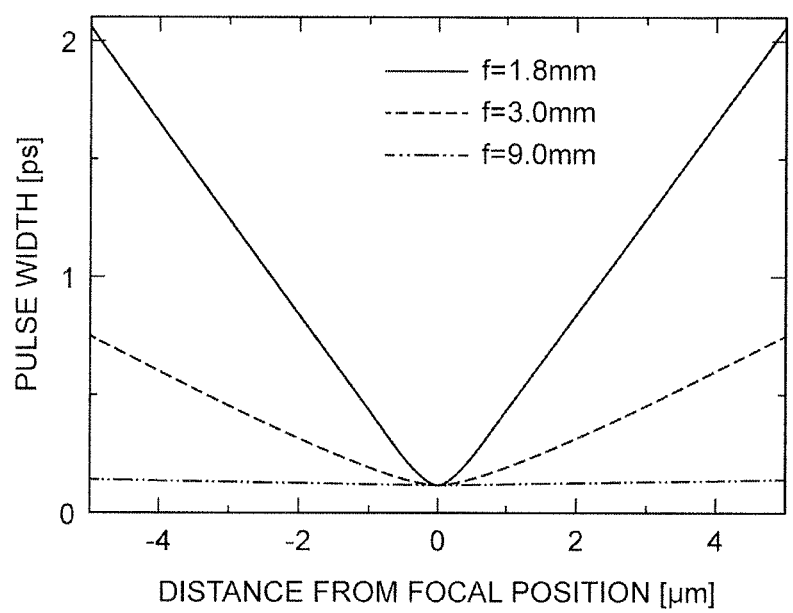
FIG. 3 is a graph illustrating a relationship of a distance in an optical axis direction from a focal position and a pulse width.
Figure 4:
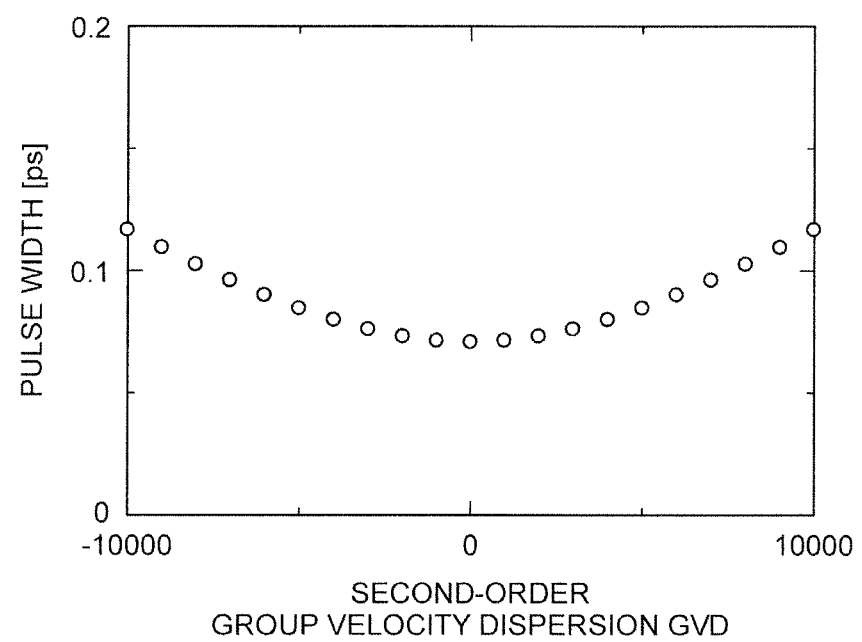
FIG. 4 is a graph illustrating an influence of second-order wavelength dispersion on a pulse width.

FIG. 3 is a graph illustrating a relationship of a distance in an optical axis direction from a focal position and a pulse width. In FIG. 3, a focal length of the focusing element 50 is set to each value of 1.8 mm, 3.0 mm, and 9.0 mm. FIG. 4 is a graph illustrating an influence of second-order wavelength dispersion on a pulse width. These are obtained by calculation by setting a diameter in a lens pupil plane to 0.1 mm, a center wavelength to 800 nm, and a minimum pulse width to 70 fs. A pulse width at a final focal point can be calculated in a subordinate relation with these parameters. When a lens having a relatively long focal length is used as the focusing element 50, there is no large difference in a pulse width in the vicinity of the focal position. However, when a lens having a short focal length such as an objective lens is used as the focusing element 50, an influence on the pulse width is remarkable, and for this reason, strict phase control becomes very important. The spatial light modulator 30 can control the wavelength dispersion precisely.

If the lens functioning as the focusing element 50 has chromatic aberration by wavelength dependency in a refractive index, a focusing characteristic is deteriorated because the focal length is different according to the wavelength. A lens using refracting power is made of optical glass, special plastic, or the like, however, a refractive index thereof is different according to a wavelength. For this reason, even when the same lens is used, the focal length is different according to the wavelength (chromatic dispersion), and as a result, a difference occurs in a size or a position of a focusing region. Further, reflection reducing coating is generally provided on a surface of the lens, and absorption/reflection by the coating may depend on the wavelength.

The spatial light modulator 30 modulates the phase spectrum or the intensity spectrum of the light in consideration of an influence of the chromatic aberration of the lens functioning as the focusing element 50 or a characteristic of the absorption/reflection of the coating. In the case in which a single lens is assumed as the focusing element 50, if curvature radii of both surfaces of the lens are set to $r_1$ and $r_2$ and a refractive index of the lens at a wavelength $\lambda$, is set to n(λ), a focal length f(λ) at the wavelength λ is obtained by the following formula. The spatial light modulator 30 can adjust both or any one of the curvature radius and the refractive index and can perform compensation.

$$f(\lambda)=\{n(\lambda)-1\}(1/r_1-1/r_2)$$

A compensation amount of wavelength dispersion of an optical system such as the focusing element 50 may be measured and obtained in advance, or may be measured and obtained on the moment, and further, the amount may be obtained by calculation. In the case of the measurement, a method such as intensity fluctuation, Auto correlation, FROG; and Pump and probe can be used.

Auto correlation is a typical method in measuring a pulse width of an ultra-short pulse. In this method, a mechanism of dividing light into two, combining the divided light components again, and including a delay circuit for adjusting an optical path length of one divided light component, is provided in a front stage of the dispersive element, and non-linear optical crystal is disposed in the vicinity of the focal position. Further, by measuring intensities of high-order harmonics generated in the non-linear optical crystal when an optical path length is changed variously, a pulse width is measured. This is the same in other measurement methods. In addition, measurement based on a method of Pump and probe is enabled by introducing the delay circuit.

In an optical component such as the focusing element 50 constituting the light irradiation apparatus 1A, unexpected wave front aberration may occur. A compensation amount may be estimated in advance by any one of wave front measurement using a wave front sensor, interference measurement, real-time measurement, and calculation. In the case of the measurement, to suppress an influence of a broadband wavelength from the light source 10, it is preferable to select a wavelength by a band-pass filter, or perform the measurement using a different light source as a probe. In addition, the computer-generated hologram displayed on the spatial light modulator 30 preferably adds correction having considered a wavelength.

In the case in which a refractive index or a wavelength dispersion characteristic is different between a material around the object 9 and the object 9, when light is focused on the inner portion of the object 9, chromatic aberration or wave front aberration may be caused by an interface or an internal structure thereof. This is remarkable when light is focused strongly by a lens having a high numerical aperture in particular. In this case, it is preferable to compensate for an influence of the wavelength dispersion or absorption/reflection generated in the lens by the spatial light modulator 30.

When light is input or output obliquely for the spatial light modulator 30, an optical path length may be different at a short wavelength side and a long wavelength side. In this case, the spatial light modulator 30 preferably compensates for an optical path difference by an inclined phase or the like.

As described above, in the light irradiation apparatus 1A according to the embodiment, the light energy density increases in the focusing region, and on the other hand, the light energy density decreases in the optical path until reaching the focusing region, so that the influence on the object is reduced. In addition, the temporal waveform of the pulsed light in the focusing region can be adjusted. Therefore, the light irradiation apparatus 1A according to the embodiment can perform fine processing, even when the apparatus is used for processing the inner portion of the object 9.

In the light irradiation apparatus 1A according to the embodiment, because the phase spectrum or the intensity spectrum of the light output from the dispersive element 20 is modulated by the spatial light modulator 30, the degree of freedom for the adjustment of the temporal waveform of the pulsed light in the focusing region is high, and the desired temporal waveform can be easily realized. In particular, the light irradiation apparatus 1A according to the embodiment preferably compensates for the wavelength dependency of the focusing characteristic of the focusing element 50 by the spatial light modulator 30, and further, compensates for the wavelength dependency of the aberration, the wavelength dispersion, the absorption, or the reflection, as the wavelength dependency of the focusing characteristic of the focusing element 50. By performing the compensation, the desired temporal waveform can be realized more surely, even when the focusing element 50 is the lens having the high numerical aperture.

The light irradiation apparatus 1A according to the embodiment controls both the dispersive element 20 and the spatial light modulator 30 simultaneously, so that wavelength dispersion compensation can be realized with high precision over a wide dynamic range.

Even if a pixel number increase and a size increase in the spatial light modulator advance in the future, the light irradiation apparatus 1A of the embodiment can be used. In addition, the light irradiation apparatus 1A according to the embodiment does not need to include a mechanical movable unit, and is robust against a vibration and the like.

(Second Embodiment)

Figure 5:
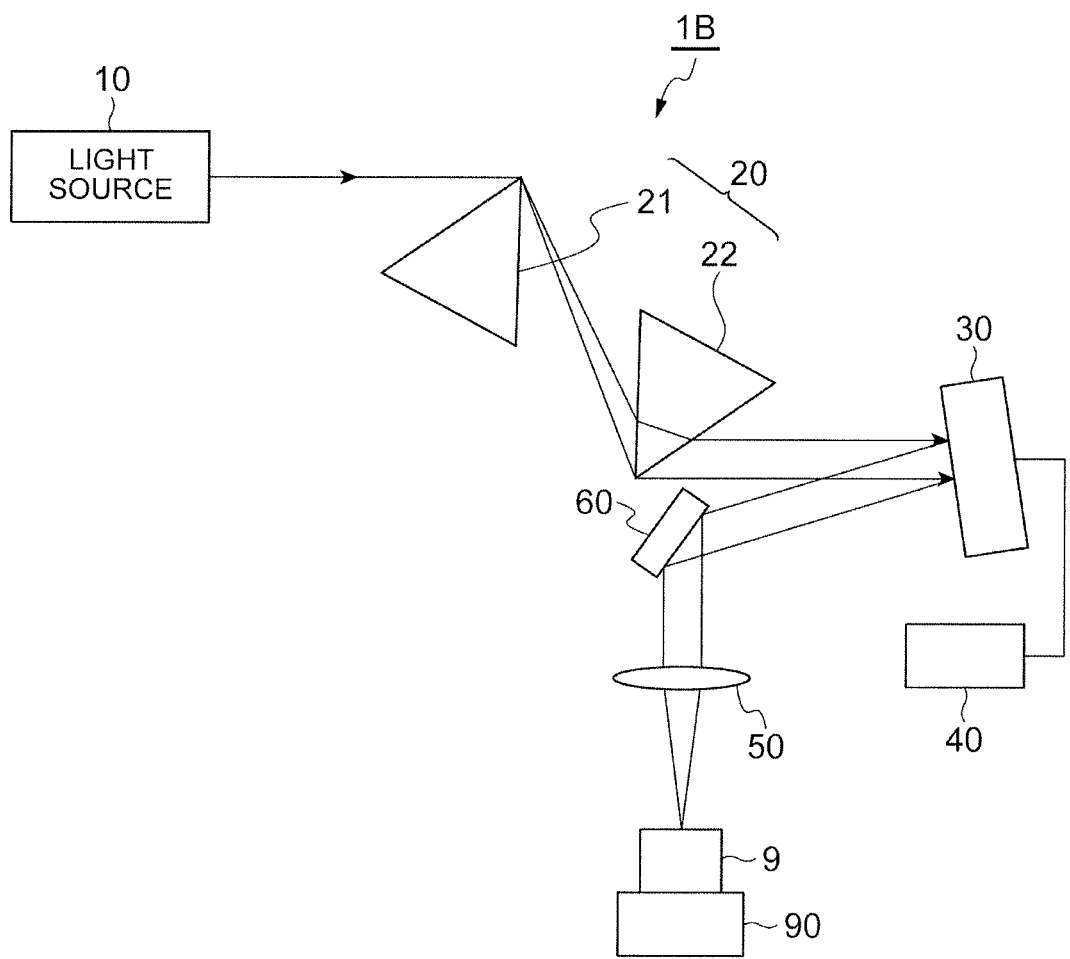
FIG. 5 is a diagram illustrating a configuration of a light irradiation apparatus 1B according to a second embodiment.

FIG. 5 is a diagram illustrating a configuration of a light irradiation apparatus 1B according to a second embodiment. The light irradiation apparatus 1B according to the second embodiment is particularly suitable for processing an object 9. The light irradiation apparatus 1B according to the second embodiment includes a light scanning device 60 and a stage 90, in addition to the configuration of the light irradiation apparatus 1A according to the first embodiment.

The stage 90 holds the object 9. The stage 90 preferably adjusts a position or a direction of the object 9, and preferably adjusts for at least one axis of an x axis, a y axis, a z axis, a θ axis, an α axis, and a β axis. The adjustment of the position or the direction may be based on an electric operation or a manual operation.

The light scanning device 60 is provided on an optical path between a spatial light modulator 30 and a focusing element 50, and can move (scan) a region (focusing region) in which light is focused by the focusing element 50. The light scanning device 60 is, for example, a galvanometer mirror.

The light irradiation apparatus 1B according to the second embodiment operates as follows. Pulsed light output from a. light source 10 is dispersed by a dispersive element 20, and is output to an optical path different according to a wavelength. Light of a wavelength according to a pixel position is input to each pixel on a modulation plane of the spatial light modulator 30.

A phase spectrum or an intensity spectrum of light output from the dispersive element 20 is modulated by the spatial light modulator 30, and light after modulation is output to an optical path different according to a wavelength. Further, light of each wavelength output from the spatial light modulator 30 is reflected by the light scanning device 60, and is focused on a common region (focusing region) in a surface or an inside of an object 9 held by a stage 90 via the optical path different according to the wavelength, by the focusing element 50. The light scanning device 60 can be controlled such that a position of the focusing region becomes a desired position, so that light can be focused on a desired region for the object 9 to perform processing. Further, in the light irradiation apparatus 1B according to the second embodiment, a position or a direction of the object 9 is moved by the stage 90, so that the light can be focused on the desired region (focusing region) for the object 9 to perform processing.

The light irradiation apparatus 1B according to the second embodiment achieves the same effects as the light irradiation apparatus 1A according to the first embodiment. The light irradiation apparatus 1B according to the second embodiment is particularly suitable for processing the object 9, and can perform fine processing of the surface or the inside of the object 9, and further, can focus light with a desired temporal waveform in the focusing region, and therefore, suppression of front/rear surface damage of the object 9 or correction of an internal absorption effect is enabled.

(Third Embodiment)

Figure 6:
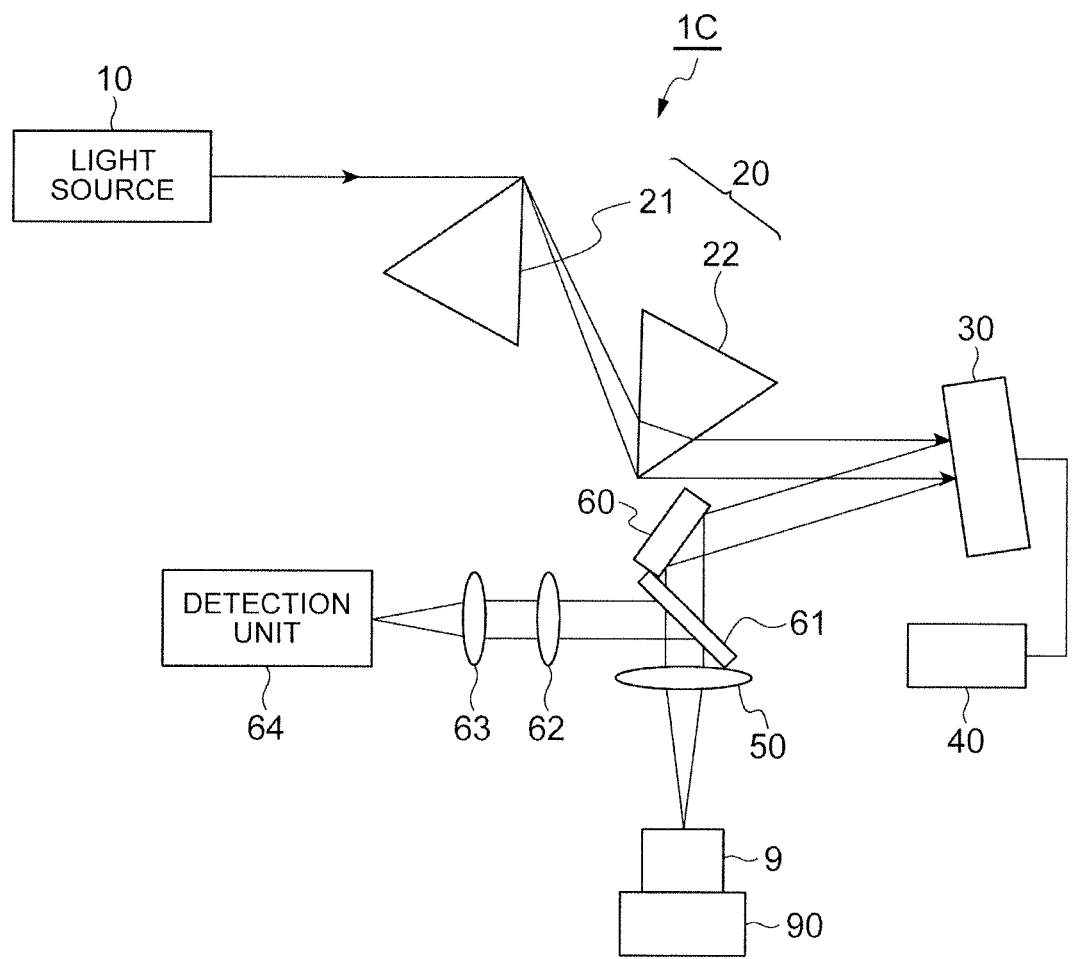
FIG. 6 is a diagram illustrating a configuration of a light irradiation apparatus 1C according to a third embodiment.

FIG. 6 is a diagram illustrating a configuration of a light irradiation apparatus 1C according to a third embodiment. The light irradiation apparatus 1C according to the third embodiment is particularly suitable for performing microscopic observation of an object 9. The light irradiation apparatus 1C according to the third embodiment includes a beam splitter 61, a lens 62, a lens 63, and a detection unit 64, in addition to the configuration of the light irradiation apparatus 1B according to the second embodiment.

The beam splitter 61 is provided on an optical path between a light scanning device 60 and a focusing element 50 and transmits light transmitted from the light scanning device 60 to the focusing element 50, and reflects light transmitted from the focusing element 50 to the lens 62.

The lenses 62 and 63 are provided on an optical path between the beam splitter 61 and the detection unit 64. The lenses 62 and 63, in addition to the lens 50, focus light generated in an object 9 by focused irradiation of light for the object 9, on a light receiving plane of the detection unit 64, or images a focusing region of the light output from the light source 10 in the object 9, on the light receiving plane of the detection unit 64.

The detection unit 64 receives and detects the light generated in the object 9 and passing through the lenses 50, 62, and 63. The detection unit 64 may be a light detector such as a photodiode, an avalanche photodiode, and a photomultiplier tube to detect light receiving intensity, or may be a light detector such as a CCD image sensor and a CMOS image sensor to detect a one-dimensional or two-dimensional light intensity distribution.

The light irradiation apparatus 1C according to the third embodiment operates as follows. Pulsed light output from the light source 10 is dispersed by a dispersive element 20 and is output to an optical path different according to a wavelength. Light of a wavelength according to a pixel position is input to each pixel on a modulation plane of a spatial light modulator 30.

A phase spectrum or an intensity spectrum of light output from the dispersive element 20 is modulated by the spatial light modulator 30, and light after modulation is output to an optical path different according to a wavelength. Further, light of each wavelength output from the spatial light modulator 30 is reflected by the light scanning device 60, transmits the beam splitter 61, and is focused on a common region in a surface or an inside of the object 9 held by a stage 90 via the optical path different according to the wavelength, by the focusing element 50.

The light generated in the object 9 by focused irradiation of light for the object 9 passes through the lens 50, the beam splitter 61, the lens 62, and the lens 63 and is received by the detection unit 64. As the light generated in the object 9, there are luminescence such as fluorescence and phosphorescence, and reflected light from the focusing region, and the like. The intensity of the light generated in the object 9 by irradiation of the light output from the light source 10 on the object 9 is detected by the detection unit 64, or an intensity distribution of the light generated in the object 9 is detected. The light scanning device 60 can be controlled such that a position of the focusing region becomes a desired position, so that light can be focused on a desired region for the object 9, and the region can be observed by the detection unit 64. In addition, a position or a direction of the object 9 is moved by the stage 90, so that light can be focused on the desired region for the object 9, and the region can be observed by the detection unit 64.

The light irradiation apparatus 1C according to the third embodiment achieves the same effects as the light irradiation apparatuses 1A and 1B according to the first and second embodiments. The light irradiation apparatus 1C according to the third embodiment is particularly suitable for performing microscopic observation of the object 9, and can be used as a multi-photon microscope to realize observation of a deep portion of the object 9. In addition, the light irradiation apparatus 1C according to the third embodiment can be used as a confocal fluorescence microscope using multi-photon absorption, a semiconductor failure analysis apparatus using multi-photon absorption, a non-staining microscopic spectroscopic apparatus, or the like.

(Modification)

The present invention is not limited to the embodiments described above, and various modifications can be made.

In the embodiments, the dispersive element 20 is configured using a pair of prisms. However, the dispersive element 20 may be configured using a pair of reflection type or transmission type diffraction gratings, or may be configured using a combination of a diffraction grating and a lens. In addition, the dispersive element 20 may use one prism, one diffraction grating, or another diffraction optical element. In any case, the dispersive element can disperse the pulsed light output from the light source 10, can output the light to the optical path different according to the wavelength, and can output the light of each wavelength in a common direction. The dispersive element configured using the combination of the diffraction grating and the lens, after dispersing the pulsed light by the diffraction grating, can cause the dispersed light of each wavelength to become parallel light by the lens.

In the embodiments, the spatial light modulator 30 is of a reflection type. However, the spatial light modulator 30 may be of a transmission type.

An aperture may be provided in the middle of the optical path. The aperture selectively outputs light of a predetermined cross-sectional region in a beam cross-section of light. An object of the aperture is, for example, to align an optical axis, control a segmentation region (used when a use diameter of a beam is matched with an optical system), change a beam shape (not limited to a circular shape and changed to any shape such as a rectangular shape), or restrict an intensity distribution in advance. In the aperture, an arrangement position is preferably adjusted, and a size or a shape of an opening region is preferably adjusted. The aperture may be a Fourier mask, or may be an intensity mask having a transmittance distribution.

A general optical component such as a filter, a dichroic mirror, and an expansion-reduction optical system may be inserted into an optical path between the light source 10 and the spatial light modulator 30, an optical path between the spatial light modulator 30 and the object 9, or an optical path between the spatial light modulator 30 and the detection unit 64, or the like. Wavelength dispersion generated in the optical component may be measured in advance or measured in real time, and the wavelength dispersion may be compensated for by the spatial light modulator 30.

When the computer-generated hologram for intensity modulation representing the blazed grating pattern is displayed on the spatial light modulator 30, the object 9 is irradiated with diffracted light of specific order of which intensity has been modulated by the blazed grating pattern, and further, diffracted light (including zero-order light) of orders other than the specific order is also generated. Because the diffracted light of the orders other than the specific order is unnecessary light, it is preferable to prevent the object 9 from being irradiated with the unnecessary light, or it is preferable to prevent actual damage from occurring, even when the object 9 is irradiated with the unnecessary light.

To prevent the object 9 from being irradiated with the unnecessary light, the unnecessary light may be blocked by focusing the light modulated by the spatial light modulator 30 by a lens and disposing an aperture, a knife edge, or the like in the vicinity of a focal point of the lens, or the light of the specific order may be selectively collimated by a 4 f optical system provided in a subsequent stage of the spatial light modulator 30. To prevent the actual damage from occurring, even when the object 9 is irradiated with the unnecessary light, irradiation of the unnecessary light to the object 9 may be dispersed and an energy density of the unnecessary light may be decreased.

The light irradiation apparatus according to the embodiment is a light irradiation apparatus for forming light of a desired temporal waveform in a focusing region, and the apparatus is configured to include (1) a light source for outputting pulsed light, (2) a dispersive element for dispersing the pulsed light, (3) a spatial light modulator for modulating a phase spectrum or an intensity spectrum of the dispersed light, and (4) a focusing element for receiving the light modulated by the spatial light modulator in a dispersed state and focusing the light on the focusing region.

The light irradiation method according to the embodiment is a light irradiation method for forming light of a desired temporal waveform in a focusing region, and the method is configured to include (1) dispersing pulsed light, by a dispersive element, (2) modulating a phase spectrum or an intensity spectrum of the dispersed light and outputting the light, by a spatial light modulator, and (3) receiving the light modulated by the spatial light modulator in a dispersed state and focusing the light on the focusing region, by a focusing element.

In the light irradiation apparatus having the above configuration, the spatial light modulator is preferably configured to compensate for wavelength dependency of a focusing characteristic of the focusing element by modulating the phase spectrum or the intensity spectrum of the light. Further, in the light irradiation apparatus, the spatial light modulator is preferably configured to modulate the phase spectrum or the intensity spectrum of the light to compensate for the wavelength dependency of the focusing characteristic of the focusing element. Likewise, in the light irradiation method having the above configuration, wavelength dependency of a focusing characteristic of the focusing element is preferably compensated for by modulating the phase spectrum or the intensity spectrum of the light, by the spatial light modulator.

Further, in the light irradiation apparatus having the above configuration, the spatial light modulator is preferably configured to compensate for wavelength dependency of aberration, wavelength dispersion, absorption, or reflection, as the wavelength dependency of the focusing characteristic of the focusing element. Likewise, in the light irradiation method having the above configuration, wavelength dependency of aberration, wavelength dispersion, absorption, or reflection, as the wavelength dependency of the focusing characteristic of the focusing element, is preferably compensated for, by the spatial light modulator.

Further, in the light irradiation apparatus having the above configuration, the spatial light modulator is preferably configured to modulate the phase spectrum or the intensity spectrum of the light, according to a modulation pattern calculated on the basis of a temporal waveform of the pulsed light output from the light source and a temporal waveform of the light in the focusing region. Likewise, in the light irradiation method having the above configuration, the phase spectrum or the intensity spectrum of the light is preferably modulated according to a modulation pattern calculated on the basis of a temporal waveform of the pulsed light and a temporal waveform of the light in the focusing region, by the spatial light modulator.

INDUSTRIAL APPLICABILITY

The present invention can be used as a light irradiation apparatus and a light irradiation method in which a degree of freedom for adjustment of a temporal waveform of pulsed light in a focusing region is high and a desired temporal waveform can be easily realized.

REFERENCE SIGNS LIST 1A, 1B, 1C—light irradiation apparatus, 9—object, 10—light source, 20—dispersive element, 21, 22—prism, 30—spatial light modulator, 40—control unit, 50—focusing element, 60—light scanning device, 61—beam splitter, 62, 63—lens, 64—detection unit, 90—stage.

The invention claimed is:

1. A light irradiation apparatus comprising:
 a light source configured to output pulsed light;
 a dispersive element configured to disperse the pulsed light and output dispersed light;
 a spatial light modulator configured to modulate at least one of a phase spectrum and an intensity spectrum of the dispersed light and output modulated light; and
 a focusing element configured to receive the modulated light in a dispersing state and focus the modulated light on a focusing region, wherein
 the spatial light modulator is configured to modulate the at least one of the phase spectrum and the intensity spectrum of the dispersed light to compensate for wavelength dependency of a focusing characteristic of the focusing element.

2. The light irradiation apparatus according to claim 1, wherein the wavelength dependency is wavelength dependency of at least one of aberration, wavelength dispersion, absorption, and reflection.

3. The light irradiation apparatus according to claim 1, wherein the spatial light modulator is configured to modulate the at least one of the phase spectrum and the intensity spectrum of the dispersed light based on a modulation pattern calculated on the basis of a temporal waveform of the pulsed light and a temporal waveform of the modulated light in the focusing region.

4. A light irradiation method comprising:

dispersing pulsed light and outputting dispersed light;

modulating at least one of a phase spectrum and an intensity spectrum of the dispersed light and outputting modulated light, by a spatial light modulator; and receiving the modulated light in a dispersing state and focusing the modulated light on a focusing region by a focusing element, wherein the modulating modulates the at least one of the phase spectrum and the intensity spectrum of the dispersed light to compensate for wavelength dependency of a focusing characteristic of the focusing element.

5. The light irradiation method according to claim 4, wherein the wavelength dependency is wavelength dependency of at least one of aberration, wavelength dispersion, absorption, and reflection.

6. The light irradiation method according to claim 4, wherein the modulating modulates the at least one of the phase spectrum and the intensity spectrum of the dispersed light based on a modulation pattern calculated on the basis of a temporal waveform of the pulsed light and a temporal waveform of the modulated light in the focusing region.

7. A light irradiation apparatus comprising:

a light source configured to output pulsed light;

a dispersive element configured to disperse the pulsed light and output dispersed light;

a spatial light modulator configured to modulate at least one of a phase spectrum and an intensity spectrum of the dispersed light and output modulated light; and a focusing element configured to receive the modulated light in a dispersing state and focus the modulated light on a focusing region, wherein the spatial light modulator is configured to modulate the at least one of the phase spectrum and the intensity spectrum of the dispersed light based on a modulation pattern calculated on the basis of a temporal waveform of the pulsed light and a temporal waveform of the modulated light in the focusing region.

8. A light irradiation method comprising:

dispersing pulsed light and outputting dispersed light;

modulating at least one of a phase spectrum and an intensity spectrum of the dispersed light and outputting modulated light, by a spatial light modulator; and receiving the modulated light in a dispersing state and focusing the modulated light on a focusing region, wherein the modulating modulates the at least one of the phase spectrum and the intensity spectrum of the dispersed light based on a modulation pattern calculated on the basis of a temporal waveform of the pulsed light and a temporal waveform of the modulated light in the focusing region.

* * * * *